(12) United States Patent
Hendricks

(10) Patent No.: US 8,559,104 B2
(45) Date of Patent: Oct. 15, 2013

(54) RETRACTABLE PROJECTION SCREEN

(75) Inventor: Robert C. Hendricks, Columbia, MD (US)

(73) Assignee: IdeaWorkx LLC, Gaithesburg, MD (US)

( * ) Notice: Subject to any disclaimer, the term of this patent is extended or adjusted under 35 U.S.C. 154(b) by 0 days.

(21) Appl. No.: 13/456,004

(22) Filed: Apr. 25, 2012

(65) Prior Publication Data

US 2012/0268815 A1   Oct. 25, 2012

Related U.S. Application Data

(60) Provisional application No. 61/478,710, filed on Apr. 25, 2011.

(51) Int. Cl.
G03B 21/56 (2006.01)

(52) U.S. Cl.
USPC .................................................. 359/461

(58) Field of Classification Search
USPC ............ 359/461, 443; 160/238, 319; 242/378
See application file for complete search history.

(56) References Cited

U.S. PATENT DOCUMENTS

| | | | | |
|---|---|---|---|---|
| 3,233,658 A | * | 2/1966 | Riedel | 160/328 |
| 3,583,465 A | * | 6/1971 | Youngs et al. | 160/264 |
| 3,916,974 A | * | 11/1975 | Lidin | 160/319 |
| 4,406,519 A | | 9/1983 | Shaw | |
| 5,379,977 A | | 1/1995 | Ronn et al. | |
| 5,579,820 A | * | 12/1996 | LePage et al. | 160/268.1 |
| 5,632,317 A | * | 5/1997 | Krupke et al. | 160/265 |
| 6,155,326 A | * | 12/2000 | Imhoff et al. | 160/243 |
| 6,876,493 B1 | | 4/2005 | Lin | |
| 6,882,898 B2 | | 4/2005 | Fore, Sr. et al. | |
| 7,510,111 B2 | | 3/2009 | Mikkelsen et al. | |
| 8,184,369 B2 | * | 5/2012 | Kuroi | 359/461 |
| 2006/0250692 A1 | | 11/2006 | Peterson et al. | |
| 2008/0030853 A1 | * | 2/2008 | Creel | 359/461 |

OTHER PUBLICATIONS

Copenheaver, Blaine R. "International Search Report and Written Opinion of the International Searching Authority, or the Declaration for International Patent Application No. PCT/US2012/035040," Jul. 31, 2012.

* cited by examiner

*Primary Examiner* — Christopher Mahoney
(74) *Attorney, Agent, or Firm* — Florek & Endres PLLC

(57) ABSTRACT

A retractable projection screen having a projection screen surface, a lower batten fixed adjacent the bottom of the projection screen surface, an upper batten fixed adjacent the top of the projection screen surface, a winch mandrel, a cable adapted to be fixed to the upper batten and wound around the winch mandrel and an outer roller on which the projection screen surface is wound. An electric motor is coupled to the winch mandrel to rotate the mandrel, thereby raising and lowering the projection screen surface.

20 Claims, 3 Drawing Sheets

RETRACTABLE PROJECTION SCREEN

FIELD OF THE INVENTION

The present invention relates to the field of projection screens, and more particularly to the field of retractable projection screens for temporary use and storage.

BACKGROUND OF THE INVENTION

Projection screens are widely used for business, educational and entertainment purposes. However, in places such as conference rooms, meeting facilities, hospitality suites, etc., projection screens may only be used occasionally, such that the need for an exposed projection screen is limited. In those environments, facility owners/managers often prefer not to have the projection screen exposed when not in use, to avoid harm to the projection surface or to otherwise detract from the aesthetics of the room. One solution that has been available is a retractable screen.

Flexible, retractable projection screen surfaces, typically made of materials such as fabric or vinyl, generally deploy from a roller located in a ceiling-recessed or ceiling-mounted housing. When in use, the viewing surface is extended or lowered from the housing to an appropriate level. This viewing level is properly determined by known ideal angles of view with regard to ergonomic factors such as eye and neck strain.

In large venues such as hotel ballrooms, convention centers or houses of worship, the high ceiling elevations require that the projection screens be lowered a fairly significant distance from the ceiling. In those installations, the retractable screen is fixed to a large length of black fabric known as "black drop" in order to bring the viewing area down to proper level (see FIG. 1 hereto). However, the use of black drop is not favored because it visually detracts from the room décor, may wrinkle or tear during retraction, etc.

Some screen manufacturers have addressed the deficiencies of "black drop" by adding an electric hoist mechanism which lowers a screen case containing the screen, roller and retraction mechanism from the ceiling to a suitable viewing level. The screen contained in the screen case is then deployed from the screen case by a separate roller motor.

This method is employed in two existing forms. In the first, a motorized hoist is fixed to a structure on or recessed into the ceiling with cables attached to the screen case, so that the hoist draws the screen case up to the ceiling. In the second, the motorized hoist is housed inside of the screen case with the cables attached to fixed points on or within the structure of the ceiling, so that the hoist draws the screen case to the ceiling. Both of these methods, however, involve the disadvantage of two separate motor systems, one for the hoist and the other for the screen roller, increasing cost, weight, complexity, maintenance and points of failure.

SUMMARY OF THE INVENTION

The present invention is directed to a retractable projection screen comprising a projection screen surface, a lower batten fixed adjacent the bottom of the screen surface, an upper batten fixed adjacent the top of the screen surface, a winch mandrel, a cable adapted to be fixed to the upper batten and wound around the winch mandrel and an outer roller on which the screen surface is wound. An electric motor is preferably coupled to the winch mandrel to rotate the mandrel, thereby raising and lowering the screen surface. Although more than one motor may be used, a single electric motor is capable of lowering and unrolling/raising and rolling the screen surface.

The projection screen surface may be formed of any suitable flexible material, including standard screen fabric, vinyl material, coated materials or any other material or fabric commonly used for retractable projection screens. The material need only be capable of presenting a projection, preferably providing a flat surface without distortion of the image, and being rolled up when not in use.

The lower batten is preferably weighted and attached adjacent the bottom of the projection screen to create tension on the screen surface, as is well known in the art, thereby providing tension to the screen surface on which a projection can be presented. The area adjacent the top of the projection screen is attached to the upper batten, preferably along the length thereof, to provide a frame for the top of the screen. In describing the upper and lower battens as adjacent the top and bottom of the projection screen, it is understood that there is generally, but not necessarily, a transition material between the screen surface and the battens. Of course, the transition would be limited and not the "black drop" used in the prior art.

It is preferred that the upper batten also include a post-tension rod in the area where the projection screen is fixed to the upper batten for reinforcement of the upper batten, to prevent curvature or sagging of the upper batten under the weight of the projection screen. In the most preferred embodiment, the upper batten fits into a recess or slot in the screen roller to complete the cylindrical form of the screen roller and provide a smooth surface onto which the fabric can be rolled.

The cable on which the screen surface is lowered is preferably attached to the upper batten, and preferably includes two cables, one at each end of the upper batten associated with the respective end of the screen surface, although more than two cables can also be used. The cable can be any suitable cable material, preferably being a steel cable or coated steel cable, capable of repeated winding and unwinding about the winch mandrel without undue stretching or breakage.

The winch mandrel can be any suitable mandrel on which the cable is wound. Although the cable may be wound in a stacked configuration on a mandrel surface at the bottom of a radial channel within the outer roller, it is preferred that the cable be wound in a single layer along the surface of the mandrel. In the most preferred embodiment, the cable is wound on each end of a winch mandrel, beyond the area of the outer roller.

The width of the mandrel is designed to fit coaxially within the outer roller, such that the mandrel will be of smaller diameter than the outer roller. In the preferred embodiment the mandrel will extend laterally beyond the length of the outer roller to receive the cable. In this embodiment, the length of the mandrel roller will be sufficient to extend far enough beyond the outer roller to permit the entire length of cable to be wound on the mandrel without interfering with the outer roller.

Alternatively, the length of the winch mandrel can be greater than, the same as or less than the length of the outer roller. More specifically, if the cable passes through a slot in the outer roller, as shown in the drawing figures, and the outer roller is stationary with the slot pointed downward while the cable is deployed, the cable can wind onto the inner mandrel until the cable is fully retracted. At that time, both the mandrel and the outer roller would move in concert to retract the screen surface.

The outer roller preferably provides a smooth, cylindrical surface on which the material of the screen surface can be rolled. Most preferably, the outer roller is fabricated with a longitudinal recess or channel corresponding to the inner profile of the upper batten, and the upper batten is formed to fit into the recess or channel in the outer roller to complete the cylindrical form of the outer roller. This preferred configuration provides a smooth surface onto which the material of the screen surface can be rolled.

The winch mandrel is motor-driven and preferably rotates independently of the outer roller when the screen surface and upper batten are entirely deployed from the outer roller. When the upper batten is seated in the outer roller, the winch mandrel and screen roller are preferably engaged, mechanically, electro-mechanically, magnetically or otherwise, to rotate together, allowing a single motor to be used for the entire process of unrolling and lowering/rolling and raising the screen surface.

Of course, it is contemplated that the retractable projection screen be adapted to fit into a ceiling recess, or fitted within a housing for mounting on the ceiling, mounting on a wall or attaching to another fixture.

BRIEF DESCRIPTION OF THE DRAWINGS

The present invention will be better understood when considered in view of the attached drawings, in which like reference characters indicate like parts. The drawings, however, are presented merely to illustrate the preferred embodiment of the invention without limiting the invention in any manner whatsoever.

DETAILED DESCRIPTION OF THE PREFERRED EMBODIMENT

Figure 1:
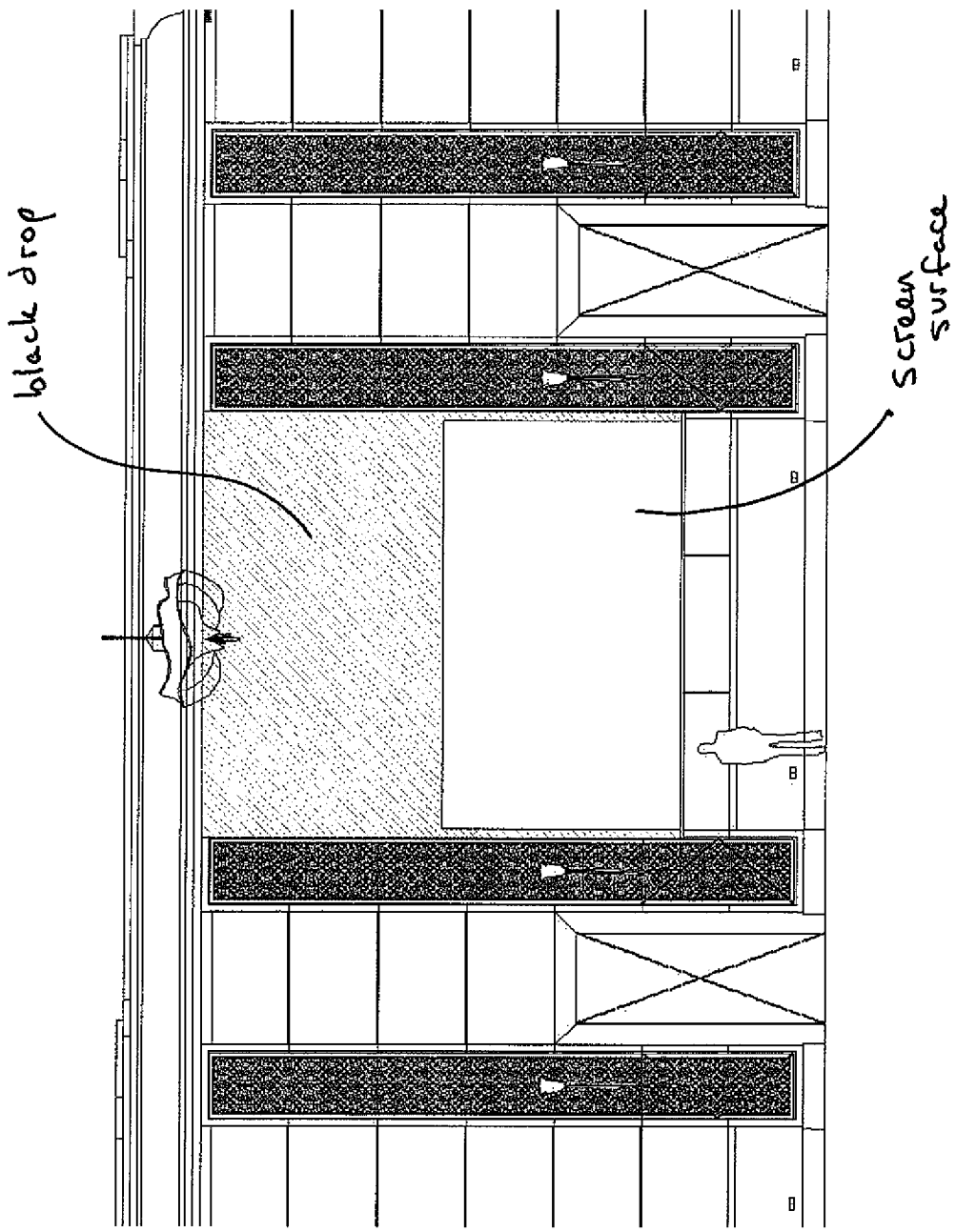
FIG. 1 is an elevation of a room with a projection screen extending from a black drop, from the prior art.
Figure 2:
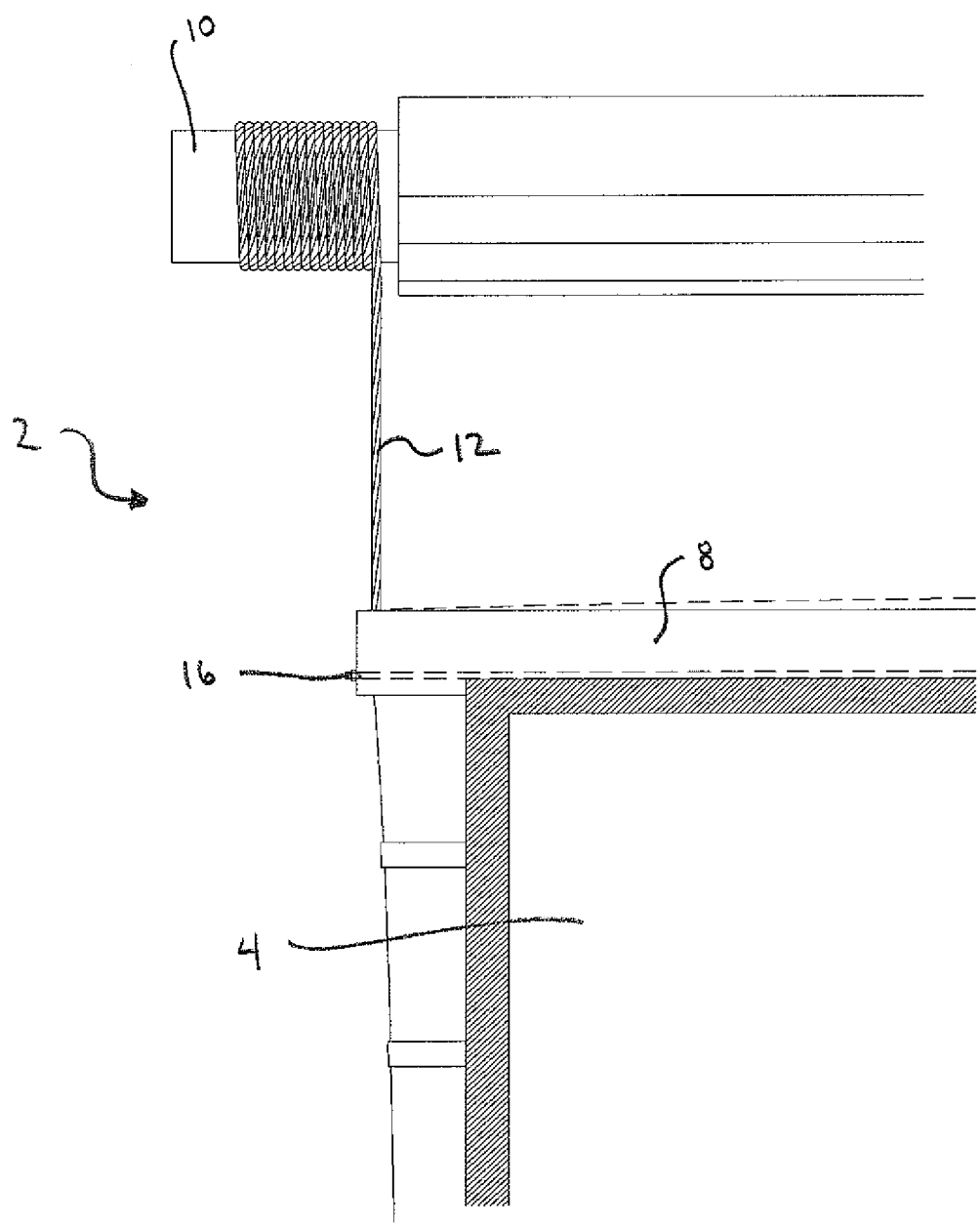
FIG. 2 is a side elevation of a preferred embodiment of the retractable projection screen of the present invention.
Figure 3:
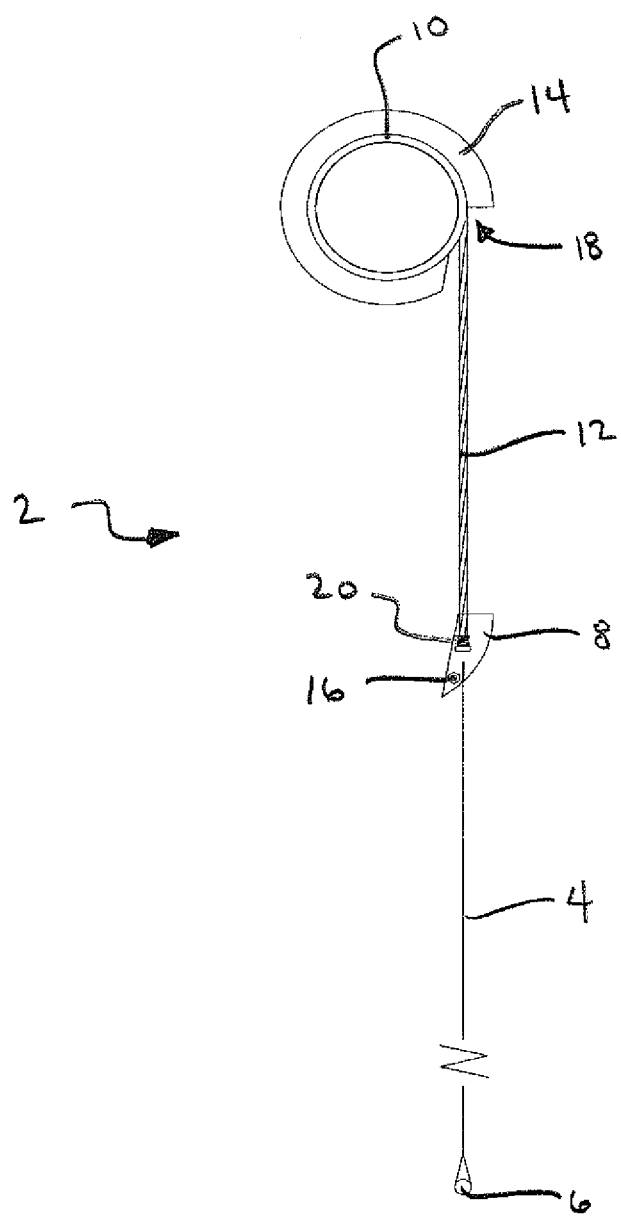
FIG. 3 is a front elevation of a preferred embodiment of the retractable projection screen of the present invention.

As shown in FIGS. 2 and 3, the preferred embodiment of the retractable projection screen 2 of the present invention comprises a projection screen surface 4, a lower batten 6 fixed adjacent the bottom of the projection screen surface 4, an upper batten 8 fixed adjacent the top of the projection screen surface 4, a winch mandrel 10, a cable 12 adapted to be fixed to the upper batten 8 and wound around the winch mandrel 10 and an outer roller 14 on which the material of the projection screen surface 4 is wound. An electric motor (not shown) is preferably coupled to the winch mandrel 10 to rotate the winch mandrel 10, thereby raising and lowering the projection screen surface 4.

The screen surface 2 is formed from standard screen fabric or vinyl material, the material of the screen surface 2 being supported at the top by the upper batten 8 and, as is typical in fabric projection screens, being weighted at the bottom by lower batten 6. This structure is used to create normal tension on the screen surface 4, to maintain its flatness and verticality.

The upper batten 8 is preferably produced from extruded aluminum. The cross-sectional profile of the upper batten 8, best shown in FIG. 3, is most preferably shaped to have a partial cylindrical surface on one side, the partial cylindrical surface having a radius of curvature equal to that of the remainder of the outer roller 14. It is preferred that the upper batten 8 be reinforced by a post-tensioned rod 16 passing through a bore or channel in the upper batten 8 to prevent curvature of the upper batten 8 when bearing the weight of the deployed screen and lower batten 6, which curvature would otherwise result in wrinkling or distortion of the screen surface 4.

Alternatively, or additionally, the curvature of the upper batten 8 may be countered by pre-cambering of the upper batten 8 to a fixed degree, as illustrated by the dotted line over the upper batten 8 in FIG. 2, based upon the known weight of the screen surface 4 of any given size.

The roller assembly for retracting the screen surface 4 is comprised of the outer roller 14 fitted coaxially with the winch mandrel 10 that is of a smaller diameter than, and extends from, each end of the outer roller 14. Steel cables 12, one at each end of the winch mandrel 10 wind and unwind around the winch mandrel 10 to raise and lower the screen surface 4.

In the most preferred embodiment shown, the outer roller 14 is fabricated with a longitudinal channel 18 corresponding to the inner profile of the upper batten 8, such that when the screen surface 4 is fully retracted, the upper batten 8 fits into the channel 18. In such embodiment, the outer profile of the outer roller 14 with the upper batten 8 fitted into the channel 18 becomes a smooth cylindrical surface upon which the screen surface 4 can be rolled as the screen surface 4 retracts further.

The proper fit of the upper batten 8 into the channel of the outer roller 14 is especially important to the present embodiment, to create an outer roller surface which is a smooth cylinder that avoids the creation of impressions in the screen surface 4. Such a reliable and secure fit may be accomplished by setting the length of the fully retracted cable 12 slightly short, and providing a spring-loading cable end 20 within the upper batten 8, as shown in FIG. 3, to compensate for tolerances and potential stretching of the cable 12.

Creating a proper fit of the upper batten 8 within the channel 18 of the outer roller 14 may also be achieved by spring-loading the temporary coupling (not shown) between the outer roller 14 and winch mandrel 10. Alternatively, magnetic or electro-mechanical means may be used to hold the upper batten 8 in proper relation to the outer roller 14, and the outer roller 14 in proper relationship to the winch mandrel 10.

A second and related critical characteristic of the retractable projection screen 2 of the present invention is the means of timing and positioning, to ensure the proper mating of the upper batten 8 with the outer roller 14. The embodiment of FIG. 3 relies on the arrival of the upper batten 8, once the cable 12 has been fully retracted, to effect transfer of rotational force from the winch mandrel 10 to the outer roller 14. Of course, numerous alternative mechanical, electro-mechanical, magnetic or other means are available for synchronizing the rotation of the winch mandrel 10 and outer roller 14, as are well known to those practiced in the art.

Additional variations, modifications and alterations to the preferred embodiment of the present invention described above will make themselves apparent to those skilled in the art. All such changes are intended to fall within the spirit and scope of the present invention, limited solely by the appended claims.

We claim:

1. A retractable projection screen comprising:
   a. a projection screen surface;
   b. a lower batten fixed adjacent the bottom of the projection screen surface;
   c. an upper batten fixed adjacent the top of the projection screen surface;
   d. a winch mandrel;
   e. a cable coupled to the upper batten and wound around the winch mandrel for raising and lowering the upper batten and projection screen surface in relation to the winch mandrel when the winch mandrel is rotated; and f. an outer roller having an exterior surface on which the projection screen surface may be wound, wherein the winch mandrel has a diameter that is less than the diameter of the outer roller and the winch mandrel may rotate independently from the outer roller.

2. The retractable projection screen of claim 1 further comprising an electric motor coupled to the winch mandrel to rotate the winch mandrel, thereby raising and lowering the projection screen surface.

3. The retractable projection screen of claim 2 wherein both the winch mandrel and the outer roller are adapted to be rotated by a single electric motor.

4. The retractable projection screen of claim 3 wherein the electric motor rotates the winch mandrel without rotating the outer roller until the cable is fully retracted and the upper batten reaches the outer roller.

5. The retractable projection screen of claim 4 wherein the electrical motor transfers rotational force from the winch mandrel alone to both the winch mandrel and the outer roller when the cable is fully retracted and the upper batten reaches the outer roller.

6. The retractable projection screen of claim 1 wherein the outer roller comprises a channel for receiving at least a portion of the upper batten.

7. The retractable projection screen of claim 6 wherein the exterior surface of the outer roller is formed in a cylindrical configuration when the upper batten is received in the channel.

8. The retractable projection screen of claim 6 wherein the upper batten is maintained in the channel of the outer roller by at least one of mechanical, electro-mechanical, magnetic and electro-magnetic means.

9. The retractable projection screen of claim 1 wherein the winch mandrel is fitted within the outer roller.

10. The retractable projection screen of claim 9 wherein the winch mandrel is coaxial with the outer roller.

11. The retractable projection screen of claim 10 wherein the winch mandrel extends from both sides of the outer roller to receive the cable as the screen surface is retracted.

12. The retractable projection screen of claim 1 wherein the upper batten further comprises a post-tension rod.

13. The retractable projection screen of claim 1 wherein the cable further comprises a spring-loading cable end.

14. The retractable projection screen of claim 13 wherein the spring-loading cable end is located on an end of the cable fixed to the upper batten.

15. The retractable projection screen of claim 1 comprising two or more cables, with at least one cable associated with each of two opposed sides of the projection screen surface.

16. The retractable projection screen of claim 1 wherein the winch mandrel is rotated without rotating the outer roller until the cable is fully retracted and the upper batten reaches the outer roller.

17. The retractable projection screen of claim 16 further comprising an electric motor coupled to the winch mandrel to rotate the winch mandrel, for raising and lowering the upper batten and projection screen surface, said electric motor further coupled to the outer roller, to rotate both the winch mandrel and the outer roller when the cable is fully retracted and the upper batten reaches the outer roller, for winding the projection screen surface on the outer roller.

18. The retractable projection screen of claim 1 wherein the winch mandrel fits within the outer roller and has a length that is the same or less than the length of the outer roller, the outer roller further comprising a slot through which the cable passes when raising and lowering the upper batten and projection screen surface in relation to the winch mandrel.

19. The retractable projection screen of claim 18 wherein the winch mandrel is rotated without rotating the outer roller until the cable is fully retracted and the upper batten reaches the outer roller.

20. The retractable projection screen of claim 19 further comprising an electric motor coupled to the winch mandrel to rotate the winch mandrel, for raising and lowering the upper batten and projection screen surface, said electric motor further coupled to the outer roller, to rotate both the winch mandrel and the outer roller when the cable is fully retracted and the upper batten reaches the outer roller, for winding the projection screen surface on the outer roller.

\* \* \* \* \*